United States Patent
Abt et al.

(10) Patent No.: US 11,912,293 B2
(45) Date of Patent: Feb. 27, 2024

(54) METHOD, SYSTEM, AND COMPUTER PROGRAM PRODUCT FOR DETERMINING A BLOCKAGE OF A SENSOR OF A PLURALITY OF SENSORS OF AN EGO VEHICLE

(71) Applicant: Bayerische Motoren Werke Aktiengesellschaft, Munich (DE)

(72) Inventors: Tin Lian Abt, Munich (DE); Kira Goehl, Munich (DE); Carsten Isert, Munich (DE); Luca Parolini, Landshut (DE); Simon Radler, Munich (DE); Sebastian Rauch, Guending (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 720 days.

(21) Appl. No.: 16/961,517

(22) PCT Filed: Nov. 22, 2018

(86) PCT No.: PCT/EP2018/082166
§ 371 (c)(1),
(2) Date: Jul. 10, 2020

(87) PCT Pub. No.: WO2019/137675
PCT Pub. Date: Jul. 18, 2019

(65) Prior Publication Data
US 2020/0353942 A1 Nov. 12, 2020

(30) Foreign Application Priority Data
Jan. 12, 2018 (EP) ..................................... 18151367

(51) Int. Cl.
*B60W 50/04* (2006.01)
*G01S 17/931* (2020.01)
(Continued)

(52) U.S. Cl.
CPC ......... *B60W 50/045* (2013.01); *G01S 13/931* (2013.01); *G01S 17/931* (2020.01);
(Continued)

(58) Field of Classification Search
CPC ........... B60W 50/045; B60W 2420/42; B60W 2420/52; G01S 13/931; G01S 17/931;
(Continued)

(56) References Cited

U.S. PATENT DOCUMENTS

2012/0053755 A1* 3/2012 Takagi .................. G01S 7/4808
701/1
2014/0214255 A1* 7/2014 Dolgov ................ G05D 1/0274
701/23
(Continued)

FOREIGN PATENT DOCUMENTS

DE 199 48 253 A1 5/2001
DE 10 2010 021 053 B3 7/2011
(Continued)

OTHER PUBLICATIONS

International Search Report (PCT/ISA/210) issued in PCT Application No. PCT/EP2018/082166 dated Jan. 29, 2019 with English translation (three (3) pages).
(Continued)

*Primary Examiner* — Adam R Mott
*Assistant Examiner* — Alyzia N Dilworth
(74) *Attorney, Agent, or Firm* — Crowell & Moring LLP

(57) ABSTRACT

A method determines a blockage of a sensor of a plurality of sensors of an ego vehicle. The method determines a prior blockage probability of the sensor of the plurality of sensors; receives sensor data of the sensor of the plurality of sensors; determines a performance of the sensor based on the received sensor data; calculates a posterior blockage probability based on the prior blockage probability of the sensor
(Continued)

and the performance of the sensor; and determines the blockage of the sensors using the calculated posterior blockage probability.

10 Claims, 4 Drawing Sheets

(51) Int. Cl.
    *G01S 13/931*     (2020.01)
    *G01S 7/497*     (2006.01)
    *G01S 7/40*     (2006.01)

(52) U.S. Cl.
    CPC ..... *B60W 2420/42* (2013.01); *B60W 2420/52* (2013.01); *G01S 7/4039* (2021.05); *G01S 2007/4975* (2013.01); *G01S 2013/9327* (2020.01)

(58) Field of Classification Search
    CPC ........... G01S 7/4039; G01S 2007/4975; G01S 2013/9327; G01S 2007/52009; G01S 15/931
    See application file for complete search history.

(56) References Cited

U.S. PATENT DOCUMENTS

| | | | |
|---|---|---|---|
| 2015/0112570 A1* | 4/2015 | Schmudderich | B60W 50/14 701/1 |
| 2015/0253775 A1* | 9/2015 | Jacobus | G05D 1/024 701/23 |
| 2016/0223647 A1* | 8/2016 | Nichols | G01S 13/89 |
| 2016/0275409 A1* | 9/2016 | Veerasamy | B32B 17/10761 |
| 2016/0368505 A1* | 12/2016 | Sorstedt | B60W 30/10 |

FOREIGN PATENT DOCUMENTS

| | | |
|---|---|---|
| DE | 10 2014 106 011 A1 | 10/2015 |
| DE | 10 2015 216 888 A1 | 3/2017 |
| WO | WO 2008/074314 A1 | 6/2008 |

OTHER PUBLICATIONS

Written Opinion (PCT/ISA/237) issued in PCT Application No. PCT/EP2018/082166 dated Jan. 29, 2019 (seven (7) pages).

Extended European Search Report issued in European Application No. 18151367.2 dated Jul. 26, 2018 (seven (7) pages).

* cited by examiner

200

| | fog | sun light |
|---|---|---|
| Lidar | 0.5 | 0.2 |
| Camera | 0.5 | 0.2 |
| Radar | 0.1 | 0.0 |

Fig. 2

METHOD, SYSTEM, AND COMPUTER PROGRAM PRODUCT FOR DETERMINING A BLOCKAGE OF A SENSOR OF A PLURALITY OF SENSORS OF AN EGO VEHICLE

BACKGROUND AND SUMMARY OF THE INVENTION

The present invention relates to a method for determining a blockage of a sensor of a plurality of sensors of an ego vehicle.

Sensor data may be used for creating an abstract, unified, representation of the environment around an ego vehicle. Such a representation is called an environment model. The accuracy of the environment model of the ego vehicle is important in order to guarantee safety of the passengers. The blockage of a sensor of the ego vehicle may lead to a restricted field of view of the sensor. In particular, if a sensor is blocked and its restricted field of view is not taken into account in the process of creating the environment model, one or more areas of the field of view which are defined as free might be occupied by obstacles that are not observed by one or more sensors of the ego vehicle. Sensors may offer some basic techniques to automatically detect a blockage of a sensor. Due to limits in the technologies of the sensors however, the detection of an actual blockage is often rather limited and might not meet safety-related requirements. Further, typical approaches for blockage detection may be based on a comparison between expected and actual sensor data. For example, if a vehicle is approaching at high speed from a near lane, it is expected that a particular sensor can track and observe the vehicle movement over time. Such expected sensor data may be compared against actual sensor data. If the sensor is not able to detect the vehicle, the sensor is likely to be blocked. Current approaches use the actual sensor data of the same sensor to determine the expected sensor data. Thus, the current approaches lack ground truth.

Accordingly, there may be a need for efficiently detecting a blockage of a sensor of a vehicle.

This need may be met by the subject matter according to the independent claims. Advantageous embodiments of the present invention are described by the dependent claims.

According to a first aspect of the invention, there is provided a method for determining a blockage of a sensor of a plurality of sensors of an ego vehicle. Preferably, the method determines the blockage of a single sensor of the plurality of sensors. The ego vehicle may be a vehicle which is able to drive fully or partially autonomous. A sensor may be defined as blocked if the sensor's field of view is limited due to environmental effects rather than other moving or static objects in the field of view of the sensor. In other words, the blockage of the sensors may be observed by environmental effects like dirt, rain, snow, ice, fog, sun light, shadow, etc.

The method determines a prior blockage probability of each single sensor of the plurality of sensors. The prior blockage probability may be defined as a probability that a single sensor of the plurality of sensors is blocked. Preferably, the prior blockage probability may be determined without using sensor data of other sensors of the plurality of sensors. In addition, the prior blockage probability may be determined using external data sources, e.g., one or more external data sources to determine current environmental conditions or current weather conditions. The method receives sensor data of the sensor of the plurality of sensors and determines a performance of the sensors based on the received sensor data. The performance of the sensor may defined as an occupancy probability which indicates whether the sensor is occupied with respect to a particular object in the field of view of the sensor. Preferably, the performance of the sensors is determined with respect to one or more other sensors of the plurality of sensors and/or one or more external reference points in the field of view of the sensor. Further, the method calculates a posterior blockage probability based on the prior blockage probability of the sensor and the performance of the sensor. Using the calculated posterior blockage probability, the blockage of the sensor of the plurality of sensors may be determined.

Advantageously, the method uses the prior blockage probability of a particular sensor and the performance of the particular sensor of the plurality of sensors relative to the performance of one or more further sensors of the plurality of sensors to determine the blockage probability of the particular sensor. The blockage of the particular sensors is determined taking into account data from external data sources, e.g., map data, for calculating the blockage probability of the sensor. The data from the external data sources defines the ground truth for determining the blockage probability of the sensor. By combining the prior blockage probability and the performance of the sensor, this may provide the advantage that the blockage of a particular sensor is identified more precisely and/or more efficiently.

According to an embodiment of the invention, determining the prior blockage probability of the sensor of the plurality of sensors may comprise determining of a first blockage probability of a sensor of the plurality of sensors of the ego vehicle based on a relative change of a motion of an object detected by the sensor, and determining of a second blockage probability of the sensor of the plurality of sensors of the ego vehicle using a predefined performance of the sensor regarding a current weather condition. For example, a weather condition may comprise fog, rain, sunlight, snow, dirt, dust or ice. Based on the first blockage probability and the second blockage probability, the prior blockage probability of the sensor of the plurality of sensors of the ego vehicle may be calculated. This may provide the advantage that a blockage of a single senor is determined efficiently by using environmental data and prediction models related to the single sensor only.

According to a further embodiment of the invention, the relative change of the motion of the object may be determined by comparing a current change of the motion of the object to one or more previous changes of the motion of the object. Determining the first blockage probability may comprise checking whether the relative change of the motion of the object deviates from a predefined range, and, if the relative change of the motion of the object deviates from the predefined range, determining the first blockage probability of a sensor of the plurality of sensors of the ego vehicle based on the relative change of the motion of the object detected by the sensor. This may provide the advantage that unrealistic motion or movement may be efficiently used to determine a blockage probability of a sensor.

According to a further embodiment of the invention, the determining of the performance of the sensor based on the received sensor data may comprise determining an occupancy probability of a sensor of the plurality of sensors for a current field of view, receiving a predefined occupancy probability of an external reference point for the current field of view, and calculating a fused occupancy probability of the current field of view based on the occupancy probability of the sensor and the predefined occupancy probability of the external reference point. Determining of the performance of the sensor based on the received sensor data may further comprise determining a deviation of the occupancy probability of the sensor from the fused occupancy probability, and determining the deviation of the occupancy probability of the sensor from the fused occupancy probability as the performance of the sensor. This may provide the advantage that the performance of the sensors is determined using ground truth data from external data sources.

According to a further embodiment of the invention, the field of view may comprise an occupancy grid of a predefined number of cells, and the occupancy probability, the predefined occupancy probability and the fused occupancy probability may be determined for each cell of the occupancy grid. This may provide the advantage that, by using occupancy grids, the method may be implemented efficiently using low computational resources.

According to a further embodiment of the invention, the occupancy probability may be determined for at least a subset of sensors of the plurality of sensors. This may provide the advantage that the occupancy probability may be efficiently determined relative to a subset of sensors of the ego vehicle.

According to a further embodiment of the invention, the determining of the blockage of the sensor using the calculated posterior blockage probability may further comprise, if the posterior blockage exceeds a predetermined blockage threshold, determining the blockage of the sensor as blocked, and, if the posterior blockage probability does not exceed the predetermined blockage threshold, determining the blockage of the sensor as non-blocked. This may provide the advantage that the blockage of the sensor may be determined efficiently using a sensor-specific predefined threshold.

According to a further aspect of the invention there is provided a computer program product for determining a blockage of a sensor of a plurality of sensors of an ego vehicle, wherein the computer program product, when being executed by a data processor, is adapted for controlling and/or for carrying out the method as described above.

According to a further aspect of the invention there is provided a system for determining a blockage of a sensor of a plurality of sensors of an ego vehicle, wherein the system comprises a processor, a memory, and instructions stored within the memory, wherein the instructions, when executed on the processor, cause the system to determine an prior blockage probability of each single sensor of the plurality of sensors, to receive sensor data of the sensor of the plurality of sensors, to determine a performance of the sensor based on the received sensor data, to calculate an posterior blockage probability based on the prior blockage probability of the sensor and the performance of the sensor, and to determine the blockage of the sensors using the calculated posterior blockage probability.

According to a further aspect of the invention there is provided a vehicle comprising the system for determining a blockage of a sensor of a plurality of sensors of an ego vehicle as described above.

As used herein, reference to a computer program or a computer program product is intended to be equivalent to a reference to a program element and/or to a computer readable medium containing instructions for controlling a computer system to coordinate the performance of the above described method.

The computer program may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

FIG. 2 shows exemplary blockage probabilities of sensors.

DETAILED DESCRIPTION OF THE DRAWINGS

Figure 1:
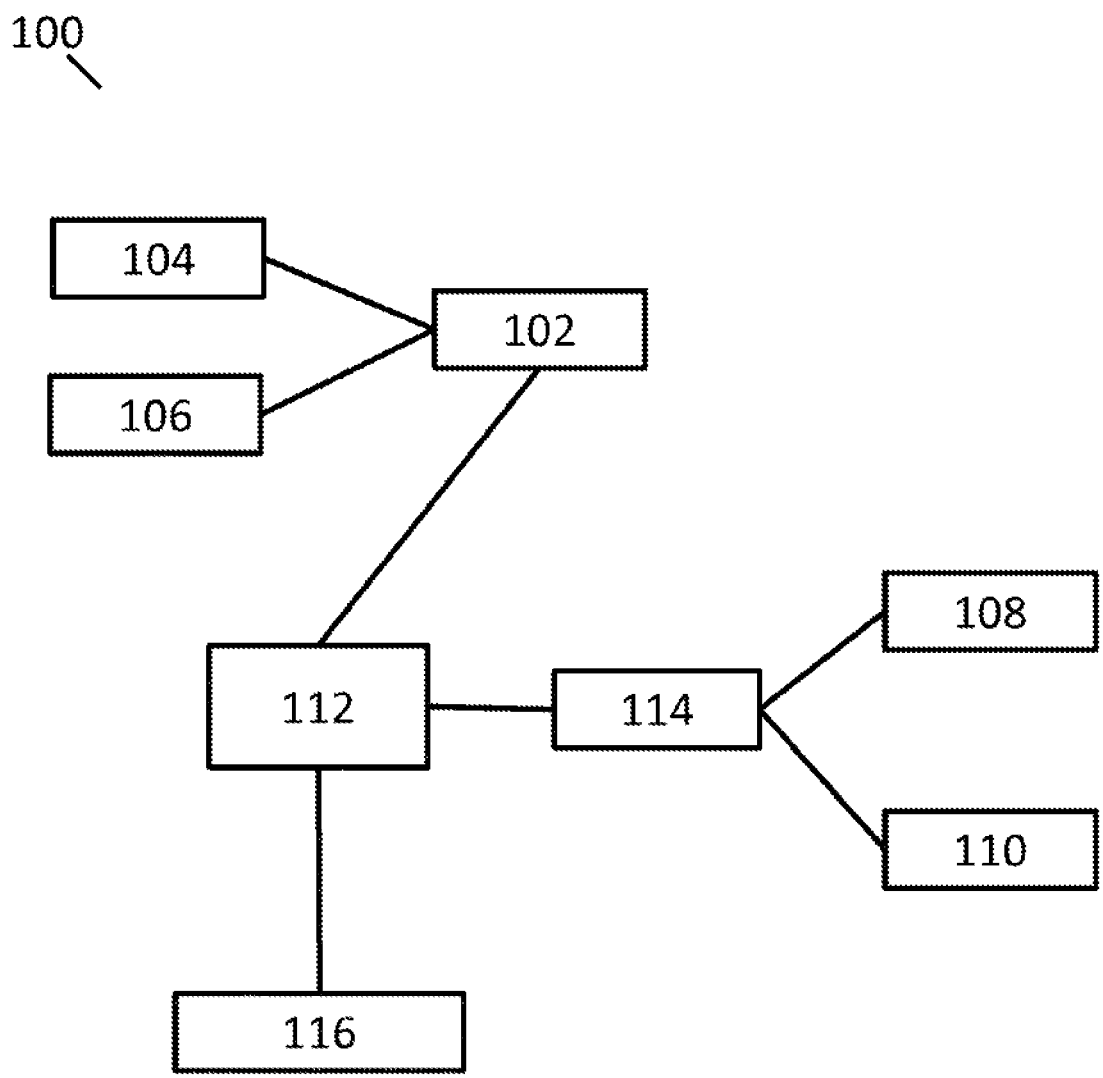
FIG. 1 shows a method for determining a blockage of a sensor.

The illustration in the drawings is schematically. It is noted that in different figures, similar or identical elements are provided with the same reference signs or with reference signs, which are different from the corresponding reference signs only within the first digit.

The present application describes a solution to the problem of identifying blockage of sensors. A sensor is considered to be blocked if its field of view, short FoV, is limited due to one or more environmental effects not related to a presence of other objects, e.g., other moving or static objects, which are present on a road. For example, a reduction of a sensor's FoV due to a truck moving nearby an ego vehicle is considered to be not a blockage, whereas a reduction of a LIDAR's FoV due to snow or salt in front of the laser is considered to be a blockage. Environmental conditions that are typically associated with a blockage are snow, ice, fog, rain, night, mud and/or direct sun light.

Typical approaches for blockage detection are based on a comparison between expected and actual sensor measurements as mentioned above. However, the comparison between expected measurement and actual sensor measurement may lack ground truth which is required to properly detect and/or identify objects on or near roads or streets and in particular to properly detect and/or identify objects in a field of view of a sensor of the ego vehicle.

In view of the above, the approach as set forth below may rely on the following two key features:

1) using data from one or more data sources which are known to be unaffected by a blockage of a sensors in order to define ground truth using the data from the one or more data sources; and 2) adjusting an importance of each sensor using the data from the one or more data sources when computing a blockage probability of a sensor.

An exemplary data source may provide weather information, in particular local weather information, which may be used to adjust the importance of a particular sensor of the ego vehicle. For example, at night, the probability that a camera is blocked due to direct sun light is considered to be very low. In summer, the probability that a LIDAR is blocked due to salt on the road or snow should also be very low.

FIG. 1 illustrates a method 100 for determining a blockage of a sensor of a plurality of sensors of an ego vehicle. The method 100 may determine 102 the prior blockage probability of a single sensor of the plurality of sensors of the ego vehicle. Preferably, the prior blockage may be estimated using a machine learning algorithm and/or an estimation function, e.g., a binary Bayes approach. To determine 102 the prior blockage probability, the method 100 may determine 104 an environmental condition, e.g., a weather condition, at a position of the ego vehicle. Exemplary environmental conditions are day, night, sunny, cloudy, rainy, icy, and/or snowy. The environmental condition may be obtained from a weather information service via an internet connection of the ego vehicle of a backend server and/or a weather sensor of the ego vehicle. The backend server may comprise a machine learning component which may receive data related to environmental conditions from other vehicles and may aggregate the received data to generate a sensor specific blockage probability based on the environmental condition. Alternatively, the backend server may compute a sensor specific blockage probability based on a weather report of a weather information service.

Exemplary blockages probabilities of sensors 200 of the ego vehicle based on different weather conditions are shown in FIG. 2. When the current weather condition indicates fog, the blockage probability of a camera sensor of the ego vehicle may be 0.5. In other words, there is a probability of 50% that the camera sensor is blocked when the weather condition is foggy. If a blockage probability of a sensor and a particular weather condition cannot be determined, a qualitative estimation of a sensors blockage may be determined, e.g., can be blocked or not relevant for blockage.

To determine 102 the prior blockage probability, the method 100 may determine 104 a motion or movement of an object detected by a single sensor of the plurality of sensors. If the object cannot be detected at a particular point in time, the motion model may assume a constant velocity of the ego vehicle. By using the constant velocity, the distance between object and the sensor may be predicted. Depending on the accuracy of the prediction, a blockage probability of the sensor may be determined. For example, the sensor may detect an object which actually does not exist. In this example, the detected object may always stay at a constant position with respect to the ego vehicle. The blockage probability of the sensor is high since a relative position of the object does not change. In a further example, an object detected by the sensor may suddenly disappear as e.g., the object moves from one area in the field of view of the sensor to another area in the field of view of the sensor and appears again in a further area in the field of view of the sensor. This unexpected behavior may also indicate a high blockage probability of the sensor.

Figure 3:
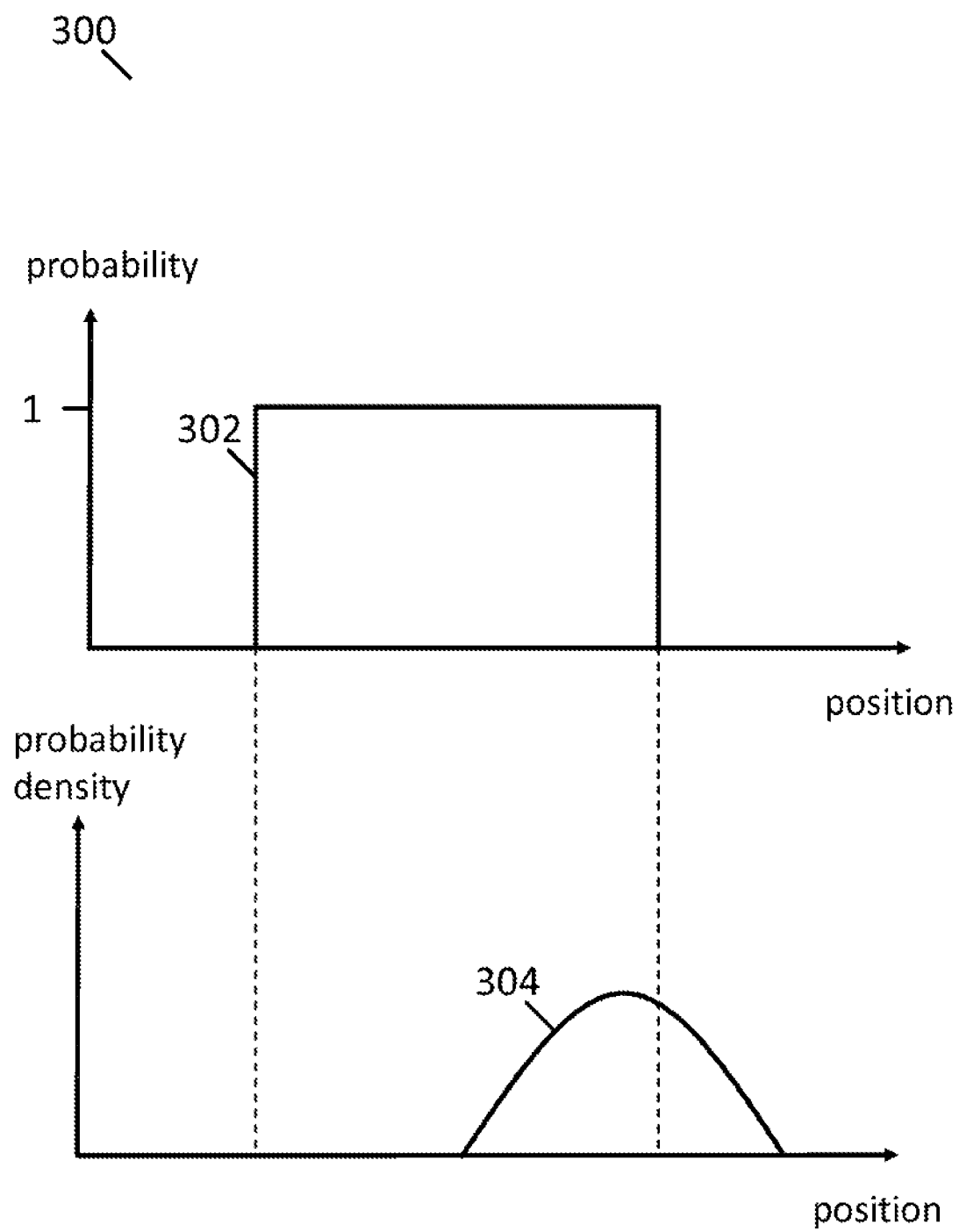
FIG. 3 shows an exemplary movement model for tracking an object by a single sensor.

FIG. 3 illustrates an approach to determining a blockage probability of a single sensor based on the tracking of an object in the sensor's field of view. From previous measurements $y_{1:k-1}$ and appropriate filtering, e.g. by application of a Kalman filter, a predicted object state $\hat{\xi}_k$ is computed for time $t_k$. The object state $\hat{\xi}_k$ comprises object position and size. This results in a probability $P_{occ}(x|\hat{\xi}_k)$ 302 that location x is occupied by the predicted object.

At time $t_k$ the sensor may register the detection of an object at a position with the probability distribution of $p(x|y_k)$ 304. The blockage probability $b_{s_i,tracking}^{t_k}$ of a single sensor $s_i$ at time $t_k$ can be determined based on the performed object tracking and the present detection. For the shown example, the blockage probability of a Lidar sensor may be determined as follows:

$$b_{Lidar,tracking} = 1 - \int_{-\infty}^{\infty} P_{occ}(x|\hat{\xi}_k) \cdot p(x|y_k) dx = 0.67.$$

The blockage probability of the sensor based on the motion model and the blockage probability of the sensor based on the environmental condition may be used to compute the prior blockage probability of the sensor. For example, a binary Bayes approach may be used to compute the prior blockage probability of a Lidar sensors in foggy weather conditions.

$$C_1 = \frac{b_{Lidar,tracking}^{t_K} * b_{Lidar,weather}^{t_K}}{(1 - b_{Lidar,tracking}^{t_K}) * (1 - b_{Lidar,weather}^{t_K})} = \frac{0.67 * 0.5}{(1 - 0.67) * (1 - 0.5)}$$

and $$b_{Ad,Lidar}^{t_K} = \frac{C_1}{1 + C_1} = \frac{2.03}{1 + 2.03} = 0.7.$$

As exemplary described above, the prior blockage probability of the Lidar sensor of the ego vehicle may be 0.7. In other words, the Lidar sensor of the ego vehicle may be blocked with a probability of 70%.

Further, the method 100 may receive 108 sensor data of a plurality of sensors and may receive 110 data related to one or more external reference points. The sensor data of the plurality of sensors, the data related to the one or more external reference points may be used to determine 112 the posterior blockage probability. The plurality of sensors may comprise any sensor of the ego vehicle, e.g., a Radar sensor, a Lidar sensor, a camera sensor, and/or a GPS sensor. The data related to an external reference point may be map data comprising one or more landmarks as external reference points. A landmark may comprise a bridge, a road signal, a sign, a traffic sign and/or a traffic light. A position of the landmark may be obtained by GPS data.

Further exemplary external reference points may comprise one or more mechanical movable elements which position may be controlled. For example, a windshield washer is a mechanical movable element of the ego vehicle which may be controlled by the ego vehicle. When moving the windshield washer in front of a camera sensor, a position of the windshield washer is known. Thus, the camera sensor should observe the windshield washer in its entire field of view. Accordingly, the windshield washer may be used as an external reference point.

Figure 4:
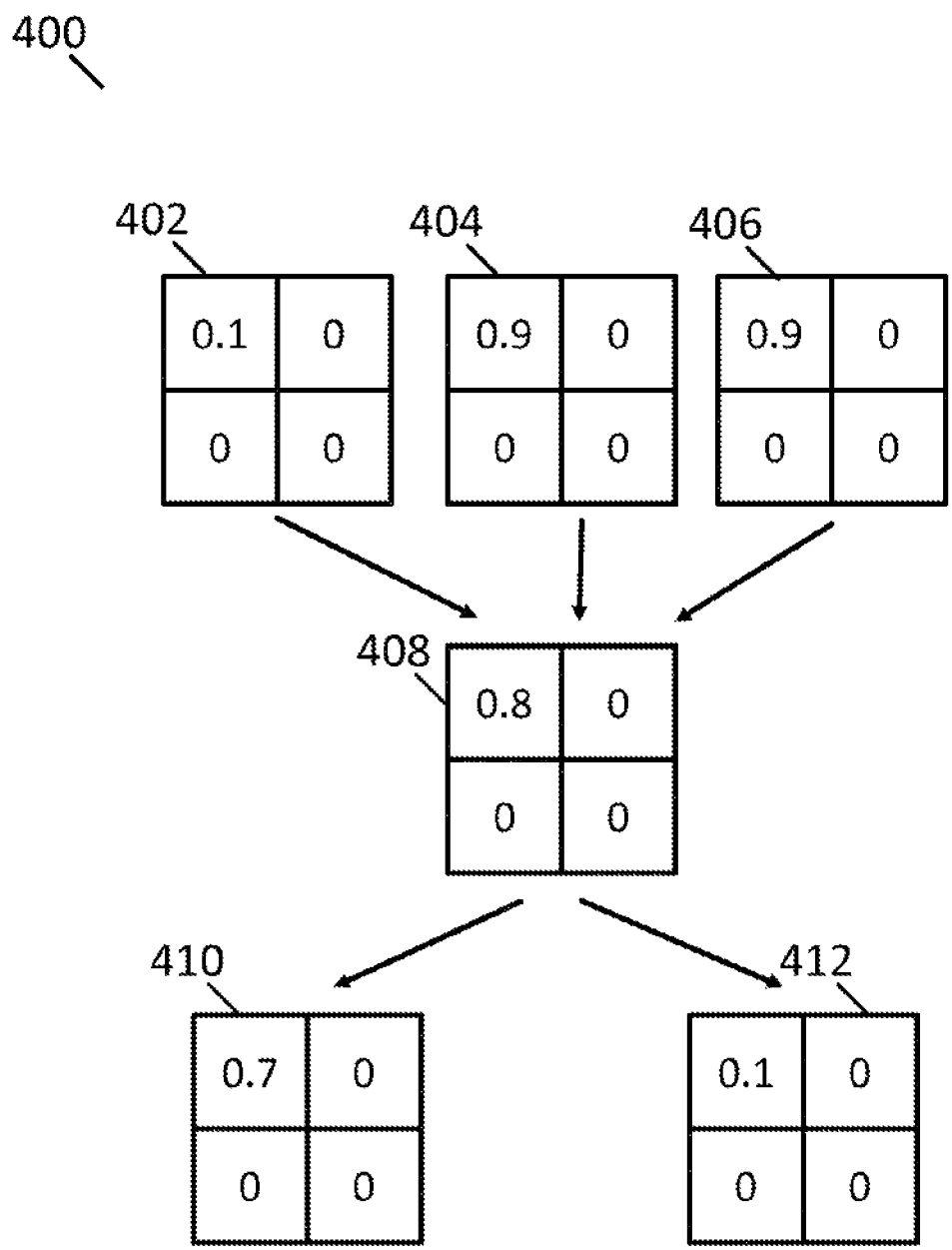
FIG. 4 shows an exemplary implementation of ground truth using occupancy grids.

As exemplary illustrated in FIG. 4, a field of view of a sensor may be represented by an occupancy grid. Each cell in the occupancy grid has a probability value between 0 and 1 representing the probability of the occupancy of that cell, in the following also referred as occupancy probability. Values close to 1 represent a high certainty that the cell is occupied by an object in that area of the field of view. Values close to 0 represent a certainty that the cell is not occupied by an object in that area of the field of view.

For example, an occupancy grid 402 of a Lidar sensor for a particular field of view may comprise 4 cells representing 4 areas of the particular field of view. Cell• of the occupancy grid 402 comprises an occupancy probability $o_{1,Lidar}^{t_K}$ of 0.1. The Lidar sensor indicates that there is a certainty that the cell is not occupied by the object. In other words, the Lidar sensor indicates that there is a certainty that the corresponding area of the field of view is most likely not occupied by the object. The Lidar sensor cannot detect the object with a high certainty.

Further, an occupancy grid 404 of a Radar sensor for the particular field of view may also comprise 4 cells representing 4 areas of the particular field of view. Cell• of the occupancy grid 404 comprises an occupancy probability $o_{1,Lidar}^{t_K}$ of 0.9. The Radar sensor indicates that here is a high certainty that the cell is occupied by the object. In other words, the Radar sensor indicates that there is a high certainty that the corresponding area of the field of view is most likely occupied by the object. The Radar sensor can detect the object with a high certainty.

Furthermore, an occupancy grid 406 related to map data of the particular field of view may also comprise 4 cells representing 4 areas of the particular field of view. The map data may comprise a landmark which can be detected by the plurality of sensors of the ego vehicle.

The landmark may represent the external reference object as described above. Cell• of the occupancy grid 306 comprises an occupancy probability $o_{1,Map}^{t_K}$ of 0.9. The map data indicates that here is a high certainty that the cell is occupied by the object, e.g., a landmark. In other words, the map data indicates that there is a high certainty that the corresponding area of the field of view is most likely occupied by the object, e.g., the landmark. The map data defines the ground truth for the sensors' detection of the object, e.g., the landmark.

Further, the method 100 may determine 114 a performance of the sensor based on the received sensor's data of the plurality of sensors of the ego vehicle and data related to one or more external reference points. To determine 114 the performance of the sensor, the occupancy grids 402, 404, and 406 may be fused using a Bayes approach to compute a fused occupancy grid 408. Next, a deviation of each occupancy grid of a sensor 402, 404 from the fused occupancy grid 408 may be derived. Occupancy grid 410 shows a deviation for the Lidar sensor and occupancy grid 412 shows a deviation for the Radar sensor.

Formally, the deviation of the occupancy probability o for each cell, of an occupancy grid for a sensor $s_i$ at time $t_K$ may be computed as follows:

$$o_{cell_j,s_i,deviation}^{t_K} = |o_{cell_j,fusion}^{t_K} - o_{cell_j,s_i}^{t_K}|.$$

Finally, the performance $b_p$ of a sensor $s_i$ at time $t_K$ may be determined as follows:

$$b_{p,s_t}^{t_K} = \frac{\sum_{}^{number\ of\ cells\ cell_j} |o_{cell_j,fusion}^{t_K} - o_{cell_j,s_i}^{t_K}|}{\sum 1^{number\ of\ cells\ cell_j}}.$$

For example, the performance of the Lidar sensor in the given example is:

$$b_{p,Lidar}^{t_K} = \frac{0.7}{4} = 0.175.$$

As defined above, the performance of a sensor defined a blockage probability of the sensors for the entire field of view of the sensor. In particular, the performance of the Lidar sensor $b_{p,Lidar}^{t_K}$ is 0.175. This means that occupancy probability of the Lidar sensor is 17.5 percent.

The method 100 may calculate 112 the posterior probability b for a sensor $s_i$ at time $t_K$ based on determined performance by $b_p$ of the sensor and the prior blockage probability $b_{AP}$ using a binary Bayes approach:

$$C_2 = \frac{b_{p,s_i}^{t_K} * b_{AP,s_i}^{t_K}}{(1 - b_{p,s_i}^{t_K}) * (1 - b_{AP,s_i}^{t_K})} = \frac{0.7 * 0.175}{(1 - 0.7) * (1 - 0.175)} = 0.49$$

and $$b_{I,i,Aa\tau}^{t_K} = \frac{C_2}{1 + C_2} = \frac{0.49}{1 + 0.49} = 0.32.$$

For the exemplary Lidar sensor the calculated a posteriori blockage probability may be 0.32. Based on the calculated posterior blockage probability, the method 100 may determine 116 the blockage of the sensor. To determine the blockage of the sensor, a threshold may be used. If the posterior blockage probability of a sensor $s_i$ is larger than the predefined threshold g, i.e. $b_{s_i}^{t_K} \leq g$, the sensor is blocked. If the posterior blockage probability of a sensor $s_i$ is smaller or equal than the predefined threshold g, i.e. $b_{s_i}^{t_K} \leq g$, the sensor is not blocked. For example, the threshold of the Lidar sensor may be g=0.5. Since the posterior blockage probability of the Lidar sensor is 0.32, the Lidar sensor is not blocked.

In case, a sensor is determined as blocked, the method 100 may perform one or more actions to resolve the blockage of the sensor e.g., by activating an integrated high performance spray mechanism. The blockage of the sensor may be determined before the action to resolve the blockage and after the action to resolve the blockage. If there is a large difference before and after the action to resolve the blockage, the sensor was most likely blocked. The method 100 may perform the action to resolve the blockage repeatedly so that the blockage of the sensor may be prevented in advance.

Advantageously, the blockage of a particular sensor may be determined more efficiently by using data regarding external reference point which defines the ground truth.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

LIST OF REFERENCE SIGNS

100 method
102 determine a prior blockage probability 104 determine a blockage probability
106 determine a blockage probability
108 receive sensor data
110 receive data regarding an external reference point
112 determine an a posteriori blockage probability
114 calculate a performance of a sensor
116 determine a blockage of a sensor
200 exemplary blockage probabilities
300 exemplary movement model for tracking an object by a single sensor
302 probability
304 probability distribution
400 exemplary implementation of ground truth using occupancy grids
402 occupancy grid
404 occupancy grid
406 occupancy grid
408 fused occupancy grid
410 deviation from fused occupancy grid
412 deviation from fused occupancy grid

What is claimed is:

1. A method for determining a blockage of a sensor of a plurality of sensors of an ego vehicle, the method comprising:
determining a prior blockage probability of the sensor, wherein the prior blockage probability is a probability that a field of view of the sensor is limited due to environmental effects;
receiving sensor data of the sensor;
determining a performance of the sensor based on the received sensor data;
calculating a posterior blockage probability based on the prior blockage probability of the sensor and the performance of the sensor; and
determining the blockage of the sensor using the calculated posterior blockage probability,
wherein determining the prior blockage probability of the sensor comprises:
determining a first blockage probability of the sensor based on a relative change of a motion of an object detected by the sensor, wherein the object is on a road within the field of view of the sensor;
determining a second blockage probability of the sensor using a predefined performance of the sensor regarding a current weather condition; and
calculating the prior blockage probability of the sensor based on the first blockage probability and the second blockage probability.

2. The method according to claim 1, wherein the relative change of the motion of the object is determined by comparing a current change of the motion of the object to one or more previous changes of the motion of the object; and
wherein determining the first blockage probability comprises:
checking whether the relative change of the motion of the object deviates from a predefined range; and
if the relative change of the motion of the object deviates from the predefined range, determining the first blockage probability of the sensor based on the relative change of the motion of the object detected by the sensor.

3. The method according to claim 1, wherein determining the performance of the sensor based on the received sensor data comprises:
determining an occupancy probability of the sensor for a current field of view;
receiving a predefined occupancy probability of an external reference point for the current field of view;
calculating a fused occupancy probability of the current field of view based on the occupancy probability of the sensor and the predefined occupancy probability of the external reference point; and
determining a deviation of the occupancy probability of the sensor from the fused occupancy probability;
determining the deviation of the occupancy probability of the sensor from the fused occupancy probability as the performance of the sensor.

4. The method according to claim 3, wherein the current field of view comprises an occupancy grid of a predefined number of cells; and
wherein the occupancy probability, the predefined occupancy probability and the fused occupancy probability is determined for each cell of the occupancy grid.

5. The method according to claim 1, wherein the occupancy probability is determined for at least a subset of sensors of the plurality of sensors.

6. The method according to claim 1, wherein determining the blockage of the sensor using the calculated posterior blockage probability comprises:
if the posterior blockage probability exceeds a predetermined blockage threshold:
determining the blockage of the sensor as blocked; and
if the posterior blockage probability does not exceed the predetermined blockage threshold:
determining the blockage of the sensor as non-blocked.

7. A computer program product for determining a blockage of a sensor of a plurality of sensors of an ego vehicle, the computer program product comprising a non-transitory computer readable medium having stored thereon program code, which, when executed by a processor, cause the product to:
determine a prior blockage probability of the sensor, wherein the prior blockage probability is a probability that a field of view of the sensor is limited due to environmental effects;
receive sensor data of the sensor;
determine a performance of the sensor based on the received sensor data;
calculate a posterior blockage probability based on the prior blockage probability of the sensor and the performance of the sensor; and
determine the blockage of the sensor using the calculated posterior blockage probability,
wherein determining the prior blockage probability of the sensor comprises:
determining a first blockage probability of the sensor based on a relative change of a motion of an object detected by the sensor, wherein the object is on a road within the field of view of the sensor;
determining a second blockage probability of the sensor using a predefined performance of the sensor regarding a current weather condition; and
calculating the prior blockage probability of the sensor based on the first blockage probability and the second blockage probability.

8. A system for determining a blockage of a sensor of a plurality of sensors of an ego vehicle, the system comprising:
a processor;
a memory;
instructions stored within the memory, wherein the instructions, when executed on the processor, cause the system to:

determine a prior blockage probability of the sensor, wherein the prior blockage probability is a probability that a field of view of the sensor is limited due to environmental effects;

receive sensor data of the sensor;

determine a performance of the sensor based on the received sensor data;

calculate a posterior blockage probability based on the prior blockage probability of the sensor and the performance of the sensor; and determine the blockage of the sensor using the calculated posterior blockage probability, wherein determining the prior blockage probability of the sensor comprises:

determining a first blockage probability of the sensor based on a relative change of a motion of an object detected by the sensor, wherein the object is on a road within the field of view of the sensor;

determining a second blockage probability of the sensor using a predefined performance of the sensor regarding a current weather condition; and calculating the prior blockage probability of the sensor based on the first blockage probability and the second blockage probability.

9. A vehicle comprising the system for determining a the blockage of the sensor of the plurality of sensors of the ego vehicle according to claim 8.

10. The method according to claim 1, wherein the prior blockage probability is between 0 and 1.

* * * * *